United States Patent

Laubert et al.

[11] 4,052,444
[45] Oct. 4, 1977

[54] N-(AMINOBENZOYL)-AMINOARYLSULFONIC ACIDS

[75] Inventors: Günter Laubert, Frankfurt am Main; Joachim Ribka, Offenbach, Main, both of Germany

[73] Assignee: Hoechst Aktiengesellschaft, Frankfurt am Main, Germany

[21] Appl. No.: 586,151

[22] Filed: June 12, 1975

Related U.S. Application Data

[63] Continuation-in-part of Ser. No. 325,597, Jan. 22, 1973, abandoned, and Ser. No. 325,656, Jan. 22, 1973, Pat. No. 3,997,523.

[30] Foreign Application Priority Data

Jan. 22, 1972 Germany ............................ 2203093
Jan. 22, 1972 Germany ............................ 2203094

[51] Int. Cl.$^2$ .................. C07C 143/52; C09B 29/20; C07C 149/40; C07C 121/50
[52] U.S. Cl. ........................ 260/507 R; 260/465 D; 260/203; 260/151; 560/13
[58] Field of Search ............... 260/507 R, 325, 597, 260/656, 470, 465 D, 507 R

[56] References Cited

U.S. PATENT DOCUMENTS

| | | | |
|---|---|---|---|
| 2,355,114 | 8/1944 | Schirm | 260/507 R |
| 3,200,109 | 8/1965 | Ribka | 260/203 |
| 3,405,119 | 10/1968 | Stocker et al. | 260/203 |

FOREIGN PATENT DOCUMENTS 2,203,093  8/1973  Germany .................. 260/507 R Primary Examiner—James O. Thomas, Jr.
Assistant Examiner—Nicky Chan
Attorney, Agent, or Firm—Curtis, Morris & Safford

[57] ABSTRACT

N-(aminobenzoyl)-aminoarylsulfonic acids and their alkali metal salts of the formula

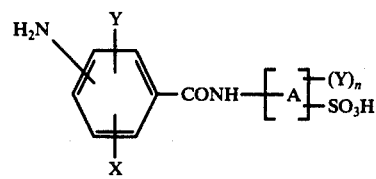

wherein X is hydrogen, chlorine, bromine, lower alkyl, lower alkoxy, alkylamino, trifluoromethyl, phenyl, phenoxy, nitro or cyano, Y represents hydrogen, chlorine, bromine, lower alkyl or lower alkoxy, A is phenylene or naphthylene and $n$ is 1 or 2, the sulfo group standing in 4-position to the benzoylamino group (which is in 1-position), are diazo components for the preparation of azo dyestuffs and the color toners and color lakes which may be obtained therefrom and which possess very good properties of fastness.

7 Claims, No Drawings

N-(AMINOBENZOYL)-AMINOARYLSULFONIC ACIDS

This is a continuation-in-part of applications Ser. Nos. 325,597 now abandoned, and 325,656, now U.S. Pat. No. 3,997,523, both filed Jan. 22, 1973.

The present invention concerns N-(aminobenzoyl)-aminoarylsulfonic acids and their alkali metal salts of the formula

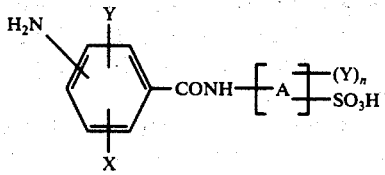
(1)

wherein X represents hydrogen or halogen, preferably chlorine or bromine, lower alkyl, lower alkoxy, methoxycarbonyl, ethoxycarbonyl, lower monoalkylamino, lower dialkylamino, trifluoromethyl, phenyl, phenoxy, nitro or cyano, Y is hydrogen or halogen, preferably chlorine or bromine, lower alkyl or lower alkoxy, A represents a benzene or naphthalene ring and n is 1 or 2, the sulfo group standing in 4 position to the benzoylamino group (which is in 1-position).

These new N-(aminobenzoyl)-aminoarylsulfonic acids are obtained by reducing N-(nitrobenzoyl)-aminoarylsulfonic acids of the formula

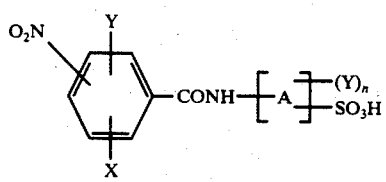
(2)

wherein X, Y, A and n have the afore-mentioned meanings to the corresponding amino compound.

The starting substances of the general formula (2) may be obtained by reacting according to known methods aminoarylsulfonic acids of the general formula

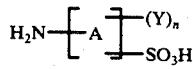
(3)

with nitrobenzoic acid chlorides of the general formula

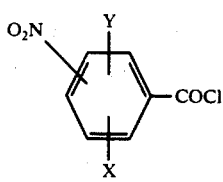
(4)

or by allowing the nitrobenzoic acids, aminoarylsulfonic acids and phosphorous trichloride to react directly with each other in pyridine, quinoline or similar solvents according to German Patent Specification No. 478 331.

In the series of the chlorine-amino-toluene-sulfonic acids and naphthylaminosulfonic acids the benzoylation is suitably effected in organic solvents, for example in pyridine, quinoline, dimethyl formamide, dimethyl sulfoxide, hexamethyl phosphoric acid triamide, N-methylpyrrolidone, tetramethyl urea or chlorobenzene.

Suitable nitrobenzoic acid chlorides of the general formula (4) are those which have the nitro group in metal or para position to the acid chloride group and which are substituted by a radical having the meaning for X and a radical having the meaning for Y, the alkyl or alkoxy groups being those which contain 1 – 4 carbon atoms such as the methyl, ethyl, propyl, i-propyl or butyl group and the corresponding alkoxy groups. Preferred nitrobenzoic acid groups are those which have the nitro group in m-position and in which X stands for a hydrogen, chlorine or bromine atom, and for a lower alkyl or alkoxy group.

Suitable nitrobenzoic acid chlorides are for example:
3-nitro-benzoylchloride,
3-nitro-2-methyl-benzoylchloride,
3-nitro-4-methyl-benzoylchloride,
3-nitro-5-methyl-benzoylchloride,
3-nitro-6-methyl-benzoylchloride,
3-nitro-4-ethyl-benzoylchloride,
3-nitro-6-ethyl-benzoylchloride,
3-nitro-2-methoxy-benzoylchloride,
3-nitro-4-methoxy-benzoylchloride,
3-nitro-6-methoxy-benzoylchloride,
3-nitro-4-ethoxy-benzoylchloride,
3-nitro-6-ethoxy-benzoylchloride,
3-nitro-2-chloro-benzoylchloride,
3-nitro-4-chloro-benzoylchloride,
3-nitro-5-chloro-benzoylchloride,
3-nitro-6-chloro-benzoylchloride,
3-nitro-4-bromo-benzoylchloride,
3-nitro-6-bromo-benzoylchloride,
3-nitro-4-phenyl-benzoylchloride,
3-nitro-6-phenyl-benzoylchloride,
3-nitro-4-phenoxy-benzoylchloride,
3-nitro-6-phenoxy-benzoylchloride,
3-nitro-4-(4'-chlorophenoxy)-benzoylchloride,
3-nitro-5-trifluoromethyl-benzoylchloride,
3-nitro-4-methoxycarbonyl-benzoylchloride,
3-nitro-5-methoxycarbonyl-benzoylchloride,
3-nitro-4-ethoxycarbonyl-benzoylchloride,
3-nitro-5-ethoxycarbonyl-benzoylchloride,
3-nitro-4-cyano-benzoylchloride,
3-nitro-5-cyano-benzoylchloride,
3-nitro-4-dimethylamino-benzoylchloride,
3-nitro-6-dimethylamino-benzoylchloride,
3-nitro-4-diethylamino-benzoylchloride,
3-nitro-2,4-dimethyl-benzoylchloride,
3-nitro-4,6-dimethyl-benzoylchloride,
3-nitro-4,6-dimethoxy-benzoylchloride,
3-nitro-2,5-dichloro-benxoylchloride,
3-nitro-4,6-dichloro-benzoylchloride,
3-nitro-4-chloro-6-methoxy-benzoylchloride,
4-nitro-benzoylchloride,
4-nitro-2-methyl-benzoylchloride,
4-nitro-3-methyl-benzoylchloride,
4-nitro-2-trifluoromethyl-benzoylchloride,
4-nitro-3-trifluoromethyl-benzoylchloride,
4-nitro-2-methoxy-benzoylchloride,
4-nitro-3-methoxy-benzoylchloride,
4-nitro-3-ethoxy-benzoylchloride,
4-nitro-2-chloro-benzoylchloride and
4-nitro-3-chloro-benzoylchloride.

As aminosulfonic acids of the general formula (3) there are mentioned the substituted sulfanilic acids as well as the corresponding acids of the naphthalene series. The substituted sulfanilic acids are preferred. These acids are substituted by one or two groups having the meaning of Y, the groups being the same as in the case of the nitrobenzoic acid chlorides. As aminosulfonic acids there are mentioned 1-aminobenzene-4-sulfonic acid,
2-chloro-aniline-4-sulfonic acid,
3-chloro-aniline-4-sulfonic acid,
2-amino-toluene-5-sulfonic acid,
2-amino-anisole-5-sulfonic acid,
3-amino-4-methoxy-toluene-6-sulfonic acid,
4-chloro-2-amino-toluene-5-sulfonic acid,
1-naphthylamine-4-sulfonic acid.

The N-(aminobenzoyl)-aminoarylsulfonic acids of the general formula (1) are prepared by reduction of the corresponding nitro compounds of the general formula (2) according to known methods (Houben-Weyl)-Methoden der organischen Chemie, volume XI/1, pages 360 et seq) preferably by catalytic reduction with hydrogen and nickel catalysts in an aqueous alkaline or alcoholic alkaline suspension. The reaction product is isolated in the usual manner by acidification of the reaction batch, suction-filtration and drying. It is likewise possible to suspend the aminoarylsulfonic acid in diluted aqueous sodium hydroxide solution and sodium carbonate and to add dropwise the corresponding nitrobenzoyl chloride at temperatures between 0° and 120° C, preferably at 10° to 40° C, while maintaining a pH of from 8 to 11. The precipitating salt of the N-(nitrobenzoyl)-aminoarylsulfonic acid may be hydrogenated directly with hydrogen in this alkaline solution in the presence of a hydrogenation catalyst. The corresponding N-(aminobenzoyl)-aminosulfonic acid salt is separated from the catalyst by suction-filtration at an elevated temperature. After addition of mineral acid, the N-(aminobenzoyl)-aminoarylsulfonic acid is obtained in very good yields. The new N-(aminobenzoyl)-aminoarylsulfonic acid and their alkali metal salts represent valuable intermediate products for the preparation of azo dyestuffs and the color toners and color lakes which may be obtained therefrom and which possess very good properties of fastness, especially to migration, solvents and to light. Therefore, they are especially useful for coloring high-molecular plastics, e.g., polyvinyl chloride or polyolefins since these pigments are especially fast to heating. Furthermore, these lakes show brilliant shades and a high covering or hiding power, or, depending on their physical properties, a high tinctorial strength or color intensity.

These color toners and lakes have the following formula

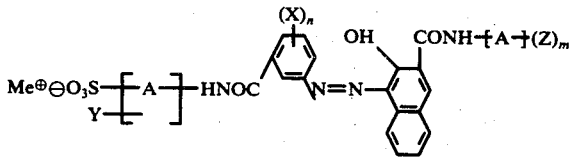

wherein X is hydrogen or halogen, preferably chlorine or bromine, alkyl, alkoxy, trifluoromethyl, phenyl, phenoxy or cyano, Y represents hydrogen or halogen, preferably chlorine or bromine, alkyl, alkoxy, carbomethoxy, phenyl or phenoxy, Z represents hydrogen, chlorine or bromine, alkyl, alkoxy, nitro, cyano, trifluoromethyl, methylsulfonyl, aminocarbonyl, alkylaminocarbonyl, phenylaminocarbonyl, aminosulfonyl, alkylaminosulfonyl, alkanoylamino or aroylamino, A represents a phenyl or naphthalene ring, n represents 1 or 2, m is an integer of from 1 to 3 and Me is an equivalent of a metal cation forming a lake. These compounds are described and claimed in copending Application Ser. No. 325,656, filed Jan. 22, 1973.

The following examples serve to illustrate the invention, the parts being by weight unless stated otherwise.

EXAMPLE 1:

47.5 Parts of sulfanilic acid were dissolved, while stirring, in 150 parts by volume of water and 24 parts by volume of a 33 % sodium hydroxide solution (pH 4.6), 26.5 parts of calcined sodium carbonate of pH 11.0 were added to the solution and the whole was cooled to 10° C by adding ice.

49.75 Parts of 2-nitrotoluene-4-carboxylic acid chloride were mixed with 50 parts by volume of acetone and dropped into the sulfanilic acid suspension within 45 minutes while stirring well, whereby the temperature rose to 35° C. After stirring for 3 hours at room temperature, the reaction was finished (pH : 8.6) and the N-(3-nitro-4-methyl-benzoyl)sulfanilic acid salt was precipitated for the most part. The reduction of the nitro group was effected directly in this suspension rendered alkaline by sodium carbonate at a nickel catalyst of about 50% by weight, the carrier being kieselguhr, at 50° C and under a pressure of 40 atmospheres of hydrogen. After completion of the reduction, the whole was heated to 90° C, suction-filtered in the hot state from the catalyst and the reduction product was precipitated, while stirring at 60° C and adding dropwise 5N hydrochloric acid (pH : 3.0). After cooling down to room temperature, the product was suction-filtered, washed and dried at 110° C under reduced pressure.

72.2 Grams of the formula

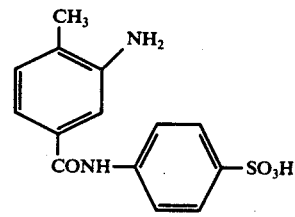

were obtained. Point of decomposition: exceeding 360° C dicyclohexylammonium salt: $C_{26}H_{37}N_3O_4$ $SH_2O$

| Calculated: | Found: | Melting point of the dicyclohexylammonium salt: |
|---|---|---|
| N: 8.3 | 8.2 | 152° C |
| S: 6.3 | 6.3 | |

| | Melting pont of the dicyclohexylammonium salt |
|---|---|
| N-(3-amino-benzoyl)-sulfanilic acid | 151° C |
| N-(3-amino-4-chloro-benzoyl)-sulfanilic acid | 140° C |
| N-(3-amino-4-methoxy-benzoyl)-sulfanilic acid | 146° C |
| N-(3-amino-4-(p-chlorophenoxy)-benzoyl)-sulfanilic acid | — |
| N-(3-amino-4-methoxycarbonyl-benzoyl)-sulfanilic acid | — |
| N-(3-amino-4-dimethylamino-benzoyl)-sulfanilic acid | — |
| N-(3-amino-4,6-dichloro-benzoyl)-sulfanilic acid | — |
| N-(3-amino-4-methyl-benzoyl)-aniline-2'-chloro-4'-sulfonic acid | 220° C |
| N-(4-amino-benzoyl)-sulfanilic acid | 283° C |
| N-(4-amino-3-methyl-benzoyl)-sulfanilic acid | 252° C |
| N-(4-amino-2-ethoxy-benzoyl)-sulfanilic acid | 242° C |

EXAMPLE 2

199.5 Parts of 2-nitrotoluene-4-carboxylic acid chloride were dropped within 45 minutes, while stirring well, to a suspension of 269 parts of the sodium salt of the 1-aminonaphthalene-4-sulfonic acid in 2300 parts by volume of pyridine, the temperature being maintained at 60° C. Stirring was continued for 3 hours at 60° C, subsequently 3 further hours in the boiling heat. The pyridine was distilled off, the remainder separated by means of steam while maintaining a pH of from 8 to 10 by adding in portions a 33 % sodium hydroxide solution. The pH was adjusted to 2 by the addition of hydrochloric acid, the whole was reprecipitated from sodium hydroxide solution and hydrochloric acid while adding active charcoal and dried at 110° C under reduced pressure. There were obtained 333 g of N-(3-nitro-4-methyl-benzoyl)-1'-naphthylamine-4'-sulfonic acid. Point of decomposition: above 360° C 330 Parts of this nitro compound were hydrogenated in 500 parts by volume of methanol and 1000 parts by volume of water at pH 9.0 with the use of Raney nickel as catalyst. After separation from the catalyst, acidification, suctionfiltration and drying there were obtained 282 g of the N-(3-amino-4-methyl-benzoyl)-1'-naphthylamine-4'-sulfonic acid. Dicyclohexylammonium salt:

| $C_{30}H_{39}N_3O_4S H_2O$ | Calculated | Found |
|---|---|---|
| N: | 7.6 | 7.4 |
| S: | 5.8 | 6.0 |

Melting point of the dicyclohexylammonium salt: 264° C

The following compound was prepared and characterized accordingly:
N-(3-amino-benzoyl)-1'-naphthylamine-4'-sulfonic acid Dicyclohexylammonium salt:

| $C_{29}H_{37}N_3O_4S \cdot \frac{1}{2}H_2O$ | Calculated | Found |
|---|---|---|
| N: | 7.9 | 8.0 |
| S: | 6.0 | 6.4 |

Melting point of the dicyclohexylammonium salt: 238° C

We claim:

1. A N-(aminobenzoyl)-aminoarylsulfonic acid or its alkali metal salt of the formula

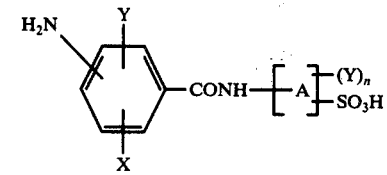

wherein X is hydrogen, chloride, bromine, lower alkyl, lower alkoxy, carbomethoxy, carboethoxy, mono- or dilower alkylamino, trifluoromethyl, phenyl, phenoxy, nitro or cyano, Y is hydrogen, chlorine, bromine, lower alkyl or lower alkoxy, A is phenyl or 1-naphthyl, n is 1 or 2, the sulfo group standing in 4-position.

2. A N-(aminobenzoyl)-aminophenylsulfonic acid or its alkali metal salt of the formula

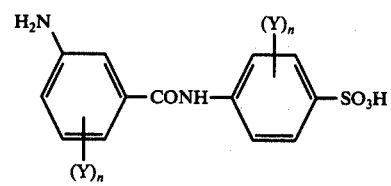

wherein Y is hydrogen, chlorine, bromine, lower alkyl or lower alkoxy and n is 1 or 2.

3. The compound of the formula

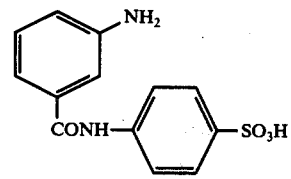

4. The compound of the formula

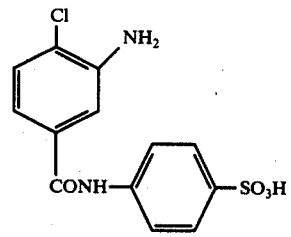

5. The compound of the formula

6. The compound of the formula
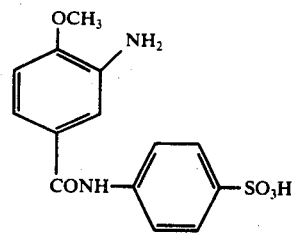
7. The compound of the formula
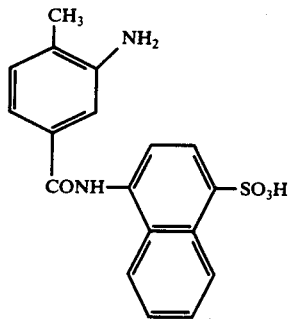
* * * * *